No. 682,365.  
L. L. MOUNT.  
GLASS TANK FURNACE.  
(Application filed Oct. 30, 1900.)  
Patented Sept. 10, 1901.

(No Model.)

WITNESSES  
INVENTOR

UNITED STATES PATENT OFFICE.

LAMBTON L. MOUNT, OF AUCKLAND, NEW ZEALAND, ASSIGNOR TO HENRY L. DIXON, OF PITTSBURG, PENNSYLVANIA.

GLASS TANK-FURNACE.

SPECIFICATION forming part of Letters Patent No. 682,365, dated September 10, 1901.

Application filed October 30, 1900. Serial No. 34,902. (No model.)

*To all whom it may concern:*

Be it known that I, LAMBTON L. MOUNT, of Auckland, New Zealand, have invented a new and useful Improvement in Glass Tank-Furnaces, of which the following is a full, clear, and exact description, reference being had to the accompanying drawings, forming part of this specification, in which—

Figure 1:
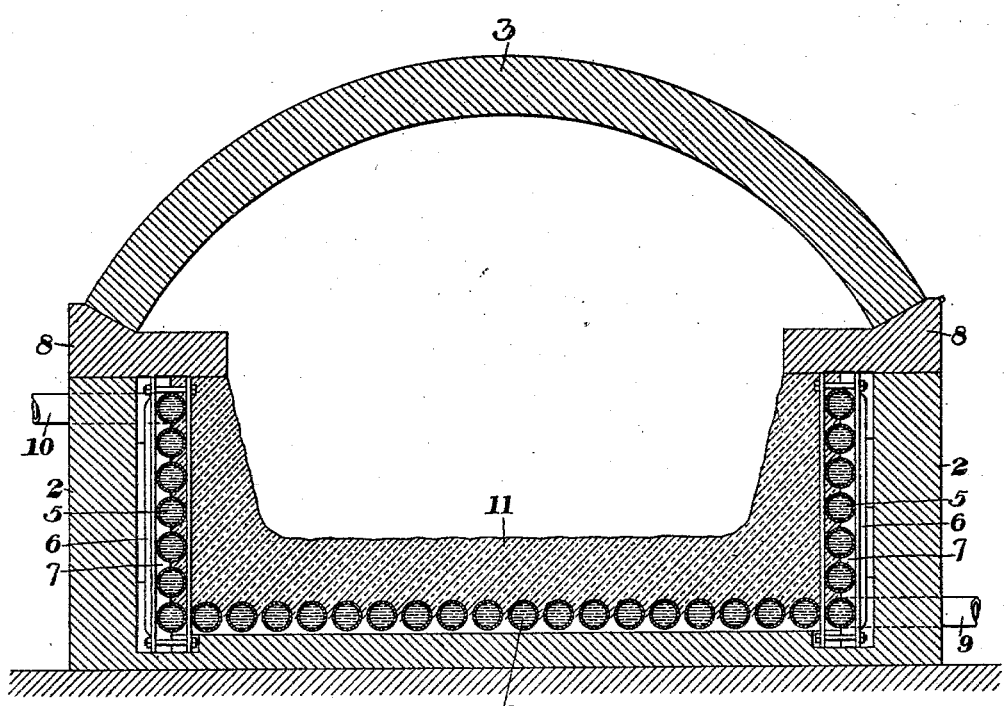
Figure 2:
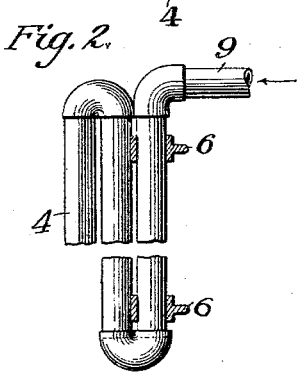

Figure 1 is a vertical section of a glass tank-furnace constructed in accordance with my invention, and Fig. 2 is a broken detail view showing the arrangement of the pipe joints or connections.

My invention relates to the construction of tank-furnaces for melting glass, and is designed to cheapen and simplify their construction and prevent the eating away of the walls, which occurs in the ordinary construction where blocks of refractory material are used.

The invention consists in constructing the tank wholly or at least partially of hollow liquid-cooled metallic pipe-sections which are in direct contact with the glass of the batch. Those portions of the glass adjacent to the cooling-sections becoming chilled, a tank is thus formed of the chilled glass itself, which is maintained by the cooling action of the circulating fluid.

In the drawings, 2 2 represent the outer refractory walls of a tank-furnace, and 3 the arched roof supported thereon.

The tank proper is formed of hollow water-cooled pipe-sections, which I have shown as in the form of a continuous pipe 4. The bottom of the tank is formed by reversely-bent sections of the pipe extending back and forth across the bottom, as shown in Fig. 2, and from one end of the bottom the pipe is continued in a square coil, which forms the sides 5 of the tank. These side coils are preferably held in place by vertical stays or buckstaves 6 6, bolted together on opposite sides of the coil, and spacing-blocks 7 may be used between the coil and the walls to prevent outward bending of the pipes. The tops of the side portions of the tank are preferably protected by wide refractory blocks 8, which are placed between the side walls and the roof and project inwardly over the coils forming the tank proper. The inlet-pipe 9 for the water leads to one end of the bottom, and the water circulating through the reverse bends enters the coil and circulates around the sides of the tank and passes out through the outlet-pipe 10.

11 represents the chilled layer of glass which is constantly maintained in the tank and which forms the tank proper in which the melting is carried on.

In starting the tank broken glass is preferably fed in to fill the metallic tank, and this glass being melted becomes chilled by the water circulating, after which the operation of melting glass may be carried on in the usual manner.

The advantages of my invention will be apparent to those skilled in the art. The eating away of the usual fire-clay blocks is done away with and the glass itself forms a protective layer over the cooling-pipes, thus giving a cheap and durable construction.

The pipe-sections may be used to form only a part of the tank instead of the whole, as in the form shown, and many other changes may be made in the form and arrangement of the parts without departing from my invention as claimed.

I claim—

1. A glass-melting tank-furnace having at least a portion of the tank formed of separate hollow pipe-sections connected at their ends and in position to be in direct contact with a batch of glass-forming material, and means for circulating a cooling fluid through the successive sections; substantially as described.

2. A glass-melting furnace having a tank whose bottom is formed of a continuous tortuous pipe-channel in position to be in direct contact with a batch of glass-forming material, and means for circulating a cooling fluid through the coil of continuous pipe; substantially as described.

3. A glass-melting furnace having a tank with its sides formed of separated pipe-sections connected alternately end to end, refractory material covering the top portion of the sides, and means for circulating a cooling fluid through the pipe-sections; substantially as described.

In testimony whereof I have hereunto set my hand.

LAMBTON L. MOUNT.

Witnesses:
F. E. GAITHER,
C. P. BYRNES.